2,866,786

PRODUCTION OF SULTAMES

Hans Feichtinger, Duisburg-Beeck, and Hans Tummes, Duisburg-Meiderich, Germany, assignors to Ruhrchemie Aktiengesellschaft, Oberhausen-Holten, Germany No Drawing. Application March 10, 1954
Serial No. 415,419

Claims priority, application Germany March 14, 1953

10 Claims. (Cl. 260—243)

This invention relates to new and useful improvements in the production of sultames. The sultames are known per se as a group of compounds. They have hitherto been prepared, for example, by thermal treatment of oxy-alkane sulfonic acid amides (see D. R. P. 740,814) or by thermal treatment of chloralkane sulfonic acid amides (see Helberger, Manecke and Fischer "Annalen der Chemie," vol. 562, page 33 (1949)). The following sultames are hitherto definitely known:

Butane sultame which has a boiling point of 193–194° C. at 12 mm. Hg and is liquid at normal temperature;

γ-Propane sultame having a boiling point of 180° C. at 5 mm. Hg and

N-methyl-γ-propane sultame having a boiling point of 191° C. at 5 mm. Hg.

One object of the invention is the production of sultames of the general formula:

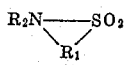

in which $R_1$ is an aliphatic straight or branched-chain saturated hydrocarbon bridge having from 3–6 carbon atoms and $R_2$ is hydrogen or an alkyl radical having 1–3 carbon atoms.

It has now been found, in accordance with the invention, that sultames of the above formula may be produced by cyclodehydrochlorinating a mineral acid salt of an aliphatic amino-alkane sulfochloride by heating or by treatment with a base.

The mineral acid salts of the amino-alkane sulfochlorides which may be used as starting materials in accordance with the invention, have the general formula:

$$HX \cdot NHR_2 - R_1 - SO_2Cl$$

in which HX is a mineral acid, $R_1$ an aliphatic alkyl radical having from 3–6 carbon atoms and $R_2$ is hydrogen or an alkyl radical having from 1–3 carbon atoms. The mineral acid is preferably a volatile acid such as a hydrohalic acid.

The salts of amino-alkane sulfochlorides as described above, used as the starting materials are easily produced by sulfo-chlorinating mineral acid salts of aliphatic amines of the general formula:

in which HX, $R_1$ and $R_2$ are as described above.

The salts used as the starting materials need not be pure salts of amino-sulfochlorides. The reaction mixtures resulting from the sulfo-chlorination of aliphatic amine salts may also be used in accordance with the invention.

The resulting sultames from the cyclo-dehydrochlorination may easily be separated from the accompanying reaction substances by extraction. The invention may also be effected using amino-alkane sulfochlorides of the above composition which are obtained by methods other than sulfochlorination.

The cyclo-dehydrochlorination of the sulfochlorides by heating to form the sultames is effected by heating the salts of amino-alkane sulfochlorides dissolved or suspended in organic solvents with stirring if required. The solvents or suspending liquids used must be inert to the salts. Preferably carrier liquids are those which under vacuum will boil under 100° C. and which may easily be distilled off from the sultames formed. Examples of suitable solvents for the conversion are benzene, toluene, xylene, nitromethane, acetonitrile, hexane, cyclohexane, heptane, and dioxane.

In addition to the cyclo-dehydrochlorination to form the sultames when heated, the salts of the amino-alkane sulfochlorides also undergo a decomposition in accordance with the following equation:

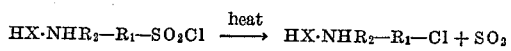

This results in the formation of salts of the chloralkyl-amines with the evolution of sulfur dioxide. Since this side reaction readily takes place at temperatures above 100° C., the thermal formation of the sultames should be effected at temperatures between 50° and 120° C. and preferably between 60° and 90° C. The reaction is effected under atmospheric pressure in order that the evolving hydrogen chloride can easily escape.

The isolation of the sultames is preferably effected by evaporation of the reaction mixture under vacuum, followed by extraction with ether, benzene or other organic solvents. The extracting agents chosen are those in which the sultames are soluble and in which the other reaction products are substantially insoluble. It has been found advantageous to dissolve the evaporated residues in water prior to the extraction and to thereafter extract the same with ether in an extracting apparatus. Evaporation of the ether extracts results in pure sultames. The yields vary between 50 and 85% of the theoretically possible yields depending on the solvents and reaction temperatures used.

The formation of the sultames from the salts of the amino-alkane sulfochlorides by cyclo-dehydrochlorination with the use of bases is preferably effected at low temperatures. Apparently the bases added react with the amino-alkane sulfochloride salts to form free amino-alkane sulfochlorides which with the dehydrochlorination undergo ring formation, resulting in the formation of the sultames. Suitable bases which may be used include inorganic bases as, for example, ammonia, alkali hydroxides and hydroxides of alkaline earths, and organic bases as, for example, aliphatic amines, pyridine, quinoline, methylamine, ethylamine, diethylamine, propylamine, butylamine, trimethylamine, aniline, dimethylaniline and ethanolamine. Alkali salts of lower aliphatic alcohols may also be used. The reaction with basic materials is effected in open vessels without the use of pressure.

The reaction with the bases may be effected with the salts of the amino-alkane sulfochlorides dissolved or when using basic liquids with the salts in solid form. The preferable solvent is water, but it is also possible to use organic solvents. The basic compounds used for the reaction must always be present in a sufficient excess that the reaction mixture after the termination of the reaction has a pH value of more than 10.

The reaction with the base may be effected at temperatures between —40° and +50° C. and preferably between —40° and +20° C.

The isolation of the sultames, when using water as the solvent, is effected by extracting the acidified reaction solution with organic solvents. Alcohols, such as methanol or ethanol are preferably used as organic solvents.

When effecting the reaction in organic solvents, it is preferable to subsequently distil the same off using vacuum if required, and to extract the residue in aqueous acid solution. The sultames formed are in the form of oily, colorless or weakly yellow colored liquids or as colorless, well crystallized substances which have a completely neutral reaction and are miscible in any proportion with water, alcohol, chloroform and benzene and immiscible or only miscible to a limited degree with ether, petroleum ether and carbon tetrachloride.

When amino-alkane sulfchlorides obtained by sulfo-chlorination are used as the starting product, the same are nonuniform with the sulfochloride group being distributed in a still unknown manner over the alkyl chain. Due to this nonuniformity the sultames obtained differ by different numbers of ring members. They represent a mixture of several isomeric sultames, the chemical composition of which corresponds to the general formula:

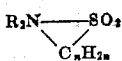

The isolation of a uniform novel crystallized sultame of the formula

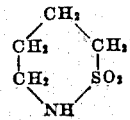

is possible by allowing the sultame mixture produced from the hydrochloride of 1-amino-butane sulfochloride-(x) to stand for a longer period of time. For the separation of this sultame, the solution must be allowed to stand for 3–7 days at room temperature, an extensive separation of the δ-butane sultame being obtainable only in this manner. A quantitative separation of this compound by allowing the mixture to stand will take 1 to 2 months. While standing, a gradual separation of the crystallized product takes place. The product recrystallized from benzene melts at 112°–113° C. The molecular weight and quantitative saponification of pure 4-amino-butane sulfonic-(1) acid proves the above constitution.

Another novel and uniform sultame which may be obtained by the process according to the invention from the sulfo-chlorination product of isobutylamine hydrochloride is β-methyl-γ-propane sultame. It is a crystallized compound which melts at 42°–43° C. It may quanatitatively be split to pure 3-amino-2-methylpropane sulfonic-(1) acid melting at 274–277° C. by boiling with concentrated hydrochloric acid.

A liquid sultame of the formula $C_5H_{11}O_2NS$ which has a boiling point of 148° C. at 0.8 mm. Hg and which has not yet been described in the literature is obtainable from the sulfochlorination product of n-pentylamine hydrochloride. This compound is a colorless oil which is little soluble in water but well miscible with most organic solvents.

A novel sultame of the formula $C_6H_{13}O_2NS$ which has not yet been described is obtainable in the crystallized form from the sulfochlorination product of n-hexylamine hydrochloride.

The sultames produced may also be isolated by chromatographic absorption on aluminium.

The sultames may be hydrolyzed by means of strong acids and bases to produce amino-alkane sulfonic acids.

Sultames may, for example, be used for the production of textile chemicals, drugs and solvents.

The following examples are given by way of illustration and not limitation:

*Example 1*

Twenty and eight tenths grams 1-amino-butane sulfochloride-(x)-hydrochloride were suspended in 150 cc. toluene in a round-bottomed flask provided with stirrer and reflux condenser, and heated for 4 hours at 100° C. while stirring and for additional 2 hours with reflux. Thereafter, the toluene was distilled off under vacuum on a water bath, the residue was dissolved in water and exhaustively extracted with ether in an extracting apparatus. After evaporation of the ethereal extract, there remained eight and nine tenths grams of a faintly yellowish colored liquid which had a completely neutral reaction, contained no chlorine under 1.4 mm. Hg distilled at 145°–160° C. and had a refractive index $n_D^{20}$ of 1.4900.

Elementary analysis of the yellowish colored liquid separated gave the following values:

Found: C, 35.00%; H, 6.97%; O, 23.52%; N, 10.09%; S, 23.43%.

These values correspond to the formula $C_4H_9O_2NS$ having the molecular weight 135.18. A composition calculated therefrom showed the following values:

Calculated: C, 35.54%; H, 6.71%; O, 23.67%; N, 10.36%; S, 23.72%.

From the oil obtained, after standing for several days, there crystallized out five-tenths of a gram of a solid product which, recrystallized from benzene, had a melting point of 112–113° C. Elementary analysis showed the same composition as that of the liquid sultame.

Found: C, 35.75%; H, 6.67%; O, 23.60%; N, 10.25%; S, 23.73%. Calculated: C, 35.54%; H, 6.71%; O, 23.67%; N, 10.36%; S, 23.72%.

Saponification of the crystallized product with concentrated hydrochloric acid resulted in a quantitative yield of 4-amino-butane-sulfonic-(1)-acid which had a melting point of 260–263° C. and decomposed above this temperature.

*Example 2*

Ten and four tenths grams 1-amino-butane-sulfochloride-(x)-hydrochloride in 50 cc. acetonitrile were heated for 10 hours with reflux in the manner described in Example 1. Thereafter, the acetonitrile was distilled off, the residue was dissolved in water and extracted with ether in an extracting apparatus. The oil obtained from the extract after evaporation of the ether was distilled under vacuum. The oil practically quantitatively distilled over from 160–167° C. at 1.5 mm. Hg. The yield was 5.1 grams of a sultame which had a refractive index $n_D^{20}$ of 1.4901.

*Example 3*

Ten and four tenths grams 1-amino-butane sulfochloride-(x)-hydrochloride in 50 cc. nitromethane were heated for 10 hours at 100° C. in the manner described in Example 1. Thereafter, the nitromethane solution was separated from the oil separated. The solution was evaporated under vacuum, mixed with water and extracted with ether. From the ethereal extract, four and ninety five one hundredths grams butane-sultame were obtained as a colorless, oily liquid. After standing for a longer time, the sultame described in Example 1 crystallized in a small amount.

*Example 4*

Twenty and eight tenths grams 1-amino-butane-sulfochloride-(x)-hydrochloride were dissolved in 20 cc. ice water. To the solution, 50 cc. 4-normal caustic soda solution were added. The solution was stirred for half an hour while cooling with ice and for another hour at room temperature. Thereafter, it was acidified with 20 cc. 10-normal hydrochloric acid and extracted with ether in an extracting apparatus. After evaporation of the ether extract, there remained 9.65 grams faintly yellowish colored butane sultame. This yield corresponded to 71.5% of the theoretically possible quantity.

*Example 5*

Eleven and eight tenths grams 1-aminopentane-sulfochloride-(x)-hydrochloride were added in small portions to 250 cc. methanol which was saturated with ammonia at 0° C. In doing so, the salt, hissing, went in solution except for a small residue. After an hour, the solution was evaporated to dryness under vacuum, mixed with 50 cc. acidified water and extracted with ether. The oil remaining after evaporation of the ether was distilled under high vacuum. At 0.8 mm., the bulk distilled over at a boiling point of 148° C. The analysis showed a pentane-sultame of the formula $C_5H_{11}O_2NS$ (149.21).

Found: C, 40.00%; H, 7.27%; O, 21.66%; N, 9.14%; S, 21.74%. Calculated: C, 40.25%; H, 7.38%; O, 21.44%; N, 9.39%; S, 21.49%.

The refractive index $n_D^{20}$ was 1.4920. The yield amounted to 4.0 grams corresponding to 49.4% of the theoretically possible quantity.

Example 6

Thirty grams of a sulfo-chlorination product prepared by sulfo-chlorinating n-butylamine hydrochloride in chloroform were mixed with 30 grams n-butylamine while cooling, and allowed to stand for 1 hour at room temperature. Following this, the excess butylamine was distilled off under vacuum on a water bath, the residue was mixed with 50 cc. 2-normal hydrochloric acid, and the hydrochloric acid solution was extracted with ether. The yield amounted to 12.2 grams liquid butane sultame having a refractive index $n_D^{20}$ of 1.4905.

Example 7

Twenty-one grams of a sulfo-chlorination product which had been prepared by sulfo-chlorinating n-pentylamine hydrochloride were dissolved at room temperature in 50 cc. pyridine and heated for 1 hour at 50° C. After having distilled off the excess pyridine under vacuum, 50 cc. 2-normal hydrochloric acid were added and the mixture was extracted with ether. Distillation of the oil remaining after evaporation of the ether resulted in 6 grams of a fraction which at 1 mm. Hg distilled over at 152° C. and had the composition of a pentane sultame and a refractive index $n_D^{20}$ of 1.4920.

Example 8

Thirty eight and eight tenths grams of a sulfochlorination product which had been prepared by sulfochlorinating n-propylamine hydrochloride in chloroform were dissolved in 150 cc. ice water and mixed with 50 cc. 8-normal caustic soda solution while thoroughly cooling. After standing for 2 hours, the solution was acidified with concentrated hydrochloric acid and extracted with ether in an extracting apparatus. Evaporation of the ether resulted in 15 grams propane sultame in the form of a colorless oil which had a refractive index $n_D^{20}$ of 149.17.

The finished product had the formula $C_3H_7O_2NS$ (121.16). The composition is to be seen from the following values:

Found: C, 29.56%; H, 5.72%. Calculated: C, 29.75%; H, 5.83%.

Example 9

The sulfo-chlorination product which had been obtained by sulfo-chlorinating 30 grams n-hexylamine hydrochloride in carbon tetrachloride was added in small portions to liquid ammonia. In doing so, the salt, hissing, went in solution. The excess ammonia was evaporated at room temperature. The residue was mixed with 100 cc. 2-normal hydrochloric acid and exhaustively extracted with ether. The residue obtained after evaporation of the ether was dissolved in benzene and the solution was subjected to chromatographic adsorption in an $Al_2O_3$ column. The benzene extract was evaporated resulting in 2.5 grams of a yellowish colored oil which at once solidified to form colorless crystals having a melting point of 70–71° C.

The finished product had the formula $C_6H_{11}O_2NS$ (163.23) and the following analytical values:

Found: C, 43.86%; H, 8.07%; O, 19.77%; N, 8.57% S, 19.24%. Calculated: C, 44.14%; H, 8.02%; O, 19.60%; N, 8.58%; S, 19.64%.

Example 10

Ten and fourth tenths grams 1-amino-butane-sulfochloride-(x)-hydrochloride were gradually added to 10 cc. of an alcoholic solution in which 6.8 grams sodium ethylate were dissolved. The solution was allowed to stand for a short time and evaporated under vacuum on a water bath. The residue was extracted several times with benzene and the combined benzene extracts were evaporated. The oil obtained was distilled under vacuum and the fraction distilling at 145–147° C. (0.8 mm. Hg) was collected. The yield amounted to 4.1 grams liquid butane sultame which had a refractive index $n_D^{20}$ of 1.4902.

Example 11

Twenty grams sulfo-chlorinated sulfate of butylamine were dissolved in ice water and mixed with caustic baryta until the solution had become alkaline. Following this, the solution was acidified with hydrochloric acid and extracted in an extracting apparatus. The residue was dissolved in benzene and subjected to chromatographic adsorption on an $Al_2O_3$ column. The benzene extract was evaporated resulting in 6.0 grams pure butane sultame having a refractive index $n_D^{20}$ of 1.4898.

Example 12

Thirty grams methyl butylamine were dissolved in 300 cc. carbon tetrachloride and neutralized with dry hydrogen chloride. After the neutralization, the reaction mixture while being irradiated with a mercury vapor lamp was treated for 20 hours at 40° C. with gaseous sulfur dioxide and chlorine. In doing so, 3.08 liters/hr. $SO_2$ and 2.63 liters/hr. of $Cl_2$ were passed into the reaction solution. During the reaction, there formed an upper layer which was separated and washed three times with 50 cc. carbon tetrachloride. The reaction product was then dissolved in 100 cc. of water. While cooling to 0° C., sufficient concentrated caustic soda solution was added that the solution showed a permanent alkaline reaction. After standing for 2 hours at room temperature, concentrated hydrochloric acid was added to the solution until it had a pH value of 3. Then it was exhaustively extracted with ether in an extraction apparatus. Evaporation of the ether solution resulted in a liquid oil. It was purified by high-vacuum distillation resulting in a colorless, viscous liquid which had a refractive index $n_D^{20}$ of 1.4753.

The chemical analysis showed the formula $C_5H_{11}O_2NS$ which corresponded to the composition of N-methyl-butane sultame.

The analytical data were as follows: Found: C, 40.13%; H, 7.36%; O, 21.56%. Calculated: C, 40.24%; H, 7.43%; O, 21.45%.

Example 13

A solution of 20 grams isobutylamine in 200 cc. chloroform was neutralized by passing in HCl gas. Then the reaction solution was treated for 20 hours at 45° C. with sulfur dioxide and chlorine in a molar ratio of 1.3:1 while irradiating with a mercury vapor lamp with the flow rate of the chlorine being 2.63 liters/hr. of Cl. The crystal slurry thus formed was sucked off and washed three times with 20 cc. chloroform and then dissolved in 100 cc. ice water. While cooling with an ice bath sufficient 9-normal caustic soda solution was added while shaking that the solution showed a permanent alkaline reaction with the pH value being 13. After having maintained the alkaline solution for 2 hours at 25° C., the pH value was adjusted to 3 by means of concentrated hydrochloric acid and the solution was exhaustively extracted with ether in an extracting apparatus. The extraction was terminated after 3 days. Evaporation of the ethereal solution resulted in 9 grams of a viscous oil which could be purified by high-vacuum distillation. The distillation product consisted of 6 grams β-methyl-γ-propane sultame as a colorless viscous liquid having a boiling point of 149°–150° C. at 1 mm. Hg which solidified to form a crystal slurry having a melting point of 42–43° C. The analysis showed the formula $C_4H_9O_2NS$. The analytical values were as follows:

Found: C, 35.37%; H, 6.64%; O, 24.41%; N, 9.95%; S, 23.32%. Calculated: C, 35.54%; H, 6.71%; O, 23.67%; N, 10.36%; S, 23.72%.

Heating of 2 grams β-methyl-γ-propane sultame with 5 cc. concentrated hydrochloric acid in a closed tube for 12 hours at 110° C. and evaporation of the reaction solution under vacuum resulted in a residue from which by recrystallization from alcohol pure 3-amino-2-methyl propane sulfonic-(1) acid melting at 274°–277° C. could quantitatively be obtained.

We claim:

1. Process for the production of sultames which comprises cyclo-dehydrochlorinating at a temperature of from −40° C. to +120° C. a mineral acid salt of an amino-alkane sulfochloride having the general formula:

$$NHR_2\text{---}R_1\text{---}SO_2Cl$$

in which $R_1$ is an aliphatic alkyl radical having 3–6 carbon atoms, and $R_2$ is a member selected from the group consisting of hydrogen and alkyl radicals having from 1–3 carbon atoms, and recovering the sultame formed.

2. Process according to claim 1 in which said cyclo-dehydrochlorination is effected by heating the mineral acid salt of the amino-alkane sulfochloride at a temperature of between 50 and 120° C.

3. Process according to claim 2 in which said heating is effected at a temperature between 60 and 90° C.

4. Process according to claim 1 in which said cyclo-dehydrochlorination is effected by contacting the mineral acid salt of the amino-alkane sulfochloride with a base at a temperature between −40° and +50° C.

5. Process according to claim 4 in which said contacting is effected at a temperature between −40° and +20° C.

6. Process according to claim 1 in which said cyclo-dehydrochlorinating is effected by contacting the mineral acid salt of the amino-alkane sulfochloride with an alkali alcoholate.

7. Process according to claim 1 in which said sultame is recovered by extraction with an organic solvent.

8. Process according to claim 1 in which sultame is recovered by forming an acid aqueous solution from the reaction mixture and thereafter extracting same with an organic solvent.

9. Process according to claim 8 in which said organic solvent is a member selected from the group consisting of ether and benzene.

10. Process according to claim 1 in which said sultame is recovered by chromatographic adsorption on alumina.

References Cited in the file of this patent

UNITED STATES PATENTS

| | | |
|---|---|---|
| 2,202,933 | Tisza et al. | June 4, 1940 |
| 2,229,784 | Winnek | Jan. 28, 1941 |
| 2,496,650 | Aelony | Feb. 7, 1950 |
| 2,553,093 | Jacob et al. | May 15, 1951 |
| 2,560,240 | Oppenauer | July 10, 1951 |
| 2,624,729 | Melamed et al. | Jan. 16, 1953 |

FOREIGN PATENTS

| | | |
|---|---|---|
| 450,737 | Belgium | June 1943 |
| 740,814 | Germany | Oct. 28, 1943 |

OTHER REFERENCES

Helberger et al.: Liebigs Ann., vol. 562, pages 23–33 (1949).